Dec. 28, 1948.   L. F. THIRY   2,457,749
ENERGY DISSIPATING ANTIVIBRATION DEVICE
Filed May 6, 1944

INVENTOR.
Leon F. Thiry.
BY
Harness, Dickey & Pierce
ATTORNEYS.

Patented Dec. 28, 1948

2,457,749

UNITED STATES PATENT OFFICE 2,457,749

ENERGY DISSIPATING ANTIVIBRATION DEVICE

Leon F. Thiry, Belgium, N. J., assignor to The General Tire & Rubber Company, Akron, Ohio, a corporation of Ohio Application May 6, 1944, Serial No. 534,495

14 Claims. (Cl. 248—358)

1

The present invention relates to antivibration mountings of the type employing a pair of relatively rigid members connected by resilient rubber or rubberlike material, and in which means are incorporated to dissipate a portion of the energy of the vibration of one of the members relative to the other in order to dampen the vibration.

It is the general object of the present invention to provide a simplified antivibration mounting or device of the type mentioned, in which the energy is dissipated by reason of the flow of fluid through a restricted orifice, in consequence of a relative movement between the members in one direction and in which the fluid is forced to return through the passageway by reason of a pocket of compressed air or gas acting upon the liquid.

One object of the invention is to provide an antivibratory device of the type mentioned in which means are incorporated to adjust the restriction to the flow of liquid in order to vary the characteristics of the mounting.

Another object of the invention is to provide an automatic thermostatic device for controlling the size of the aperture to compensate for changes in viscosity of the liquid employed.

Another object of the invention is to provide simple means for injecting both the liquid and a gas into the unit after it is assembled in order that the quantity of liquid and the normal pressure of the gas may be varied as desired.

Referring to the drawings, in which a number of modified forms of the invention are illustrated:

Figure 5:
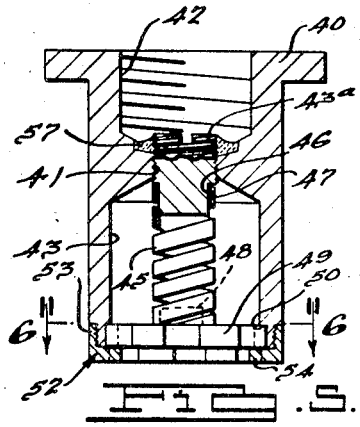
Figure 5 is a fragmentary view of the inner member only of a further modified form of the invention employing thermostatic means for controlling the degree of opening of the orifice.

2 of Figure 5 of the orifice defining elements of the mechanism shown in Figure 5.

Figure 1:
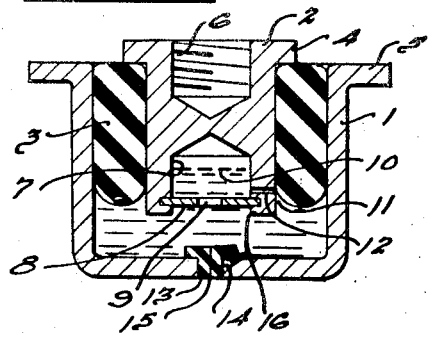
Figure 1 shows a simplified form of the invention employing an annular ring of rubber which is held in place between the rigid elements of the mounting, under a relatively high degree of distortion, by friction between the rubber ring and the rigid member.

As shown in Figure 1, the mounting of the present invention, in its simplest form, comprises a cup-shaped outer member 1 within which is telescoped a cylindrical member 2. In the annular space between the two members is inserted an annular rubber ring 3 which, in the assembly illustrated, is under a state of distortion due to radial compression and consequent axial elongation. The ring may be inserted in any desired manner, such as that set forth in applicant's Patent No. 1,739,270. The tendency of the rubber ring to return to its initial form causes it to bear tightly against the engaged walls of the members 1 and 2 with sufficient friction to prevent permanent axial displacement of the two members. The inner member is preferably provided with a flange 4 which overlies to a limited extent the upper end of the annular rubber ring 3 to increase the resistance offered to permanent displacement of the member 2 relative to the ring 3 in a downward direction. While not illustrated, a similar shoulder may be provided on the cup member 1 at the lower end of the ring 3 in the manner illustrated and described hereafter in connection with the modification of Figure 3.

In use, the member 1 is fastened by means of its flange 5 to a support and member 2 and secured by means of the tapped opening 6 to the supported member in order to isolate the supported member from a vibration of the support, or vice versa. It will be apparent that limited relative movement between the members 1 and 2 is possible in an axial direction and that the members may also move to a limited extent radially and annularly with respect to each other by reason of the resiliency of the rubber ring 3.

In accordance with the present invention the lower end of the member 2 is provided with a recess 7, which is partially closed by means of a plate 8 having an aperture 9 therein. The plate 8 divides the chamber at the closed end of the cup member 1 into two compartments. The lower compartment and a portion of the upper compartment (recess 7) are filled with a liquid of any suitable or desired viscosity leaving an air space above the level of the liquid in recess 7. Preferably the liquid level in the upper compartment is of sufficient height, as indicated by the line 10, so that when the mounting is turned on its side the level will lie above the opening 9 in order to permit use of the mounting in a position in which its axis extends horizontally as well as vertically.

It will be apparent that upon relative axial oscillations of member 2 relative to the member 1, the member 2, and to some extent the rubber ring 3, will act as a piston which will, on downward movement, force the liquid beneath the plate 8 upwardly through the opening 9, into the recess 7 causing a compression of the air within the recess. When the member 2 moves upwardly, the air or gas in the upper portion of the recess 7 will force the liquid downwardly through the opening 9 to maintain the chamber below the plate filled.

If the chamber below the plate is entirely filled with liquid, it will be apparent that no relative movement between the members 1 and 2 can occur without flow of liquid through the aperture 9. Such flow, due to the restrictive effect of the aperture, will dissipate a portion of the energy of vibration and thus dampen the vibration. To assist in the elimination of air pockets, which may form at the point indicated 11, one or more very small openings 12 may be provided in the wall of the member 2 through which, on downward movement of the member 2, relative to the member 1, any air trapped at the point 11 will be forced into the recess 7. The openings 12 may be made small enough so that they do not materially check the flow of liquid, and, if desired, they may be so located that under normal conditions they are covered by the rubber ring 3 and only exposed on downward movement of the member 2 relative to the member 1. If the mounting is positioned with its axis horizontal these openings should be eliminated.

For some purposes it is advantageous to have a small amount of air or gas trapped in the chamber below the plate 8, since small quantities of trapped gas cushion the action of the mounting and permit vibration of limited amplitude without any appreciable dampening effect. Accordingly for some purposes the openings 12 may be omitted and a small quantity of air and gas permitted to remain in the annular area region 11 and the corresponding region at the outer side of the ring 3.

It will be observed that the energy dissipating characteristics of the mounting may be adjusted as desired by selecting a liquid of a desired viscosity and by properly proportioning the size of the opening 9. However, the pumping action of the member 2 is a positive pumping action only in one direction since the air pressure within the recess 7 is relied upon for the return flow. Accordingly, it is highly desirable to maintain the pressure of the trapped air and gas in recess 7 at a high enough value to insure that all of the liquid forced into the recess on the downward stroke of the member 2 will be forced outward on the upward stroke without forming a vacuum in the chamber below the plate 8. The degree of pressure required will depend upon the viscosity of the liquid and the size of the opening.

Any desired means may be provided through which the liquid and air or gas may be introduced into the unit. However, an exceedingly simple and effective means is illustrated in Figure 1. This means comprises a rubber plug 13 which is inserted under substantial radial compression within an opening 14 in the bottom of the cup-shaped member 1. The plug 13 contains a hole, indicated by the line 15, which is normally closed by reason of the compression exerted upon the plug by the walls of the opening 14. The plug may be of the type employed in footballs, and other inflated balls, by means of which the ball may be inflated through the hypodermic needle. The material of the plug is of such character that it effectively seals the opening when the needle is removed but does not offer any substantial resistance to insertion of the needle. It will be apparent that by reason of the self-sealing plug 13, the liquid may be readily inserted within the unit after assembly. During such insertion of the liquid the pressure of the trapped air will progressively increase. If the final pressure exceeds, or is less than, the desired value, the needle may be forced far enough into the unit so that the opening adjacent its end lies in the trapped air space of chamber 7. When the needle is in this position any desired amount of the air may be permitted to escape through it or additional air may be inserted to obtain the desired pressure in the final mounting.

Any suitable method of securing the plate 8 within the lower end of the recess 7 may be employed. As illustrated, however, the plate is secured in position by providing a shallow countersunk recess in the end of the member 2, inserting the plate 8, and crimping on the edge of the recess at 16 to hold the plate in position.

Figure 2:
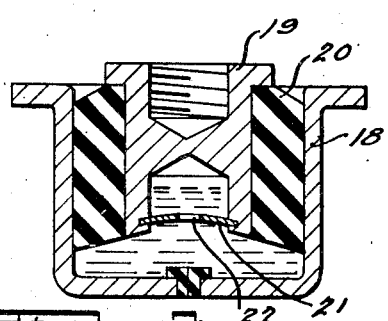
Figure 2 shows a similar construction employing a bonded annular rubber ring in place of the type employed in Figure 1.

In Figure 2 there is illustrated a substantially identical construction to that illustrated and described in connection with Figure 1. However the outer member 18 is resiliently secured with respect to the inner member 19 by means of a ring 20 of rubber, which is molded to the final form illustrated and bonded in any desired manner to the members 18 and 19. One advantage of this arrangement is that it enables a preselection of a lower contour for the ring 20 which slopes upwardly toward the center and hence eliminates possible air pockets beneath the plate 21. The plate 21 may also, if desired, be curved upwardly, as illustrated, to further insure that any air or gas within the lower portion of the chamber will pass upwardly through the opening 22 therein. In all other respects the mounting of Figure 2 is identical in construction and mode of operation to that illustrated and described in connection with Figure 1.

Figure 3:
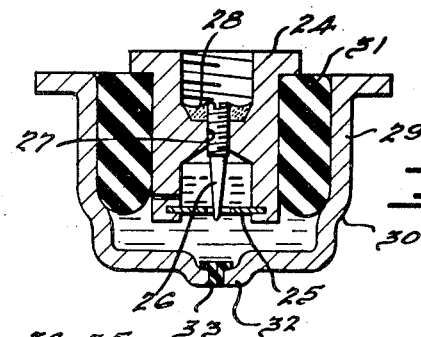
Figure 3 shows a modification of the invention similar to that illustrated in Figure 1 but incorporating means to adjust the size of the restricted orifice.

In Figure 3 is illustrated a further modification of the invention incorporating means to adjust the size of the orifice through which the liquid must pass on relative vibration between the two elements of the mounting. In this mounting the inner member 24 i provided with an orifice plate 25 and a tapered needle 26 having a threaded upper portion threaded within a tapped opening 27 in the member 24. By threading the needle 26 inwardly and outwardly through the tapped opening 27 the effective size of the aperture in the plate 25 may be adjusted to any desired extent. Any suitable means may be employed to lock the needle in a finally adjusted position and to prevent leakage of the trapped air pressed through the tapped opening 27. For units in which the effective size of the orifice need only be adjusted on one occasion the needle may be locked against subsequent movement by hammering an annular ring of annealed copper 28 into the space surrounding the upper threaded portion of the needle. This provides an effective seal for the threaded opening 27 and also locks the needle against movement. During the hammering operation the inner member 24 should be forced downwardly until it seats against the bottom of the cup-shaped outer member.

The remaining features of the unit illustrated in Figure 3 are identical to the corresponding features of the units illustrated in Figure 1 except that the walls of the outer cup-shaped member 29 are drawn inwardly at 30 to form a shoulder to resist downward movement of the rubber ring 31 relative to the member 29 and the bottom portion of the member 29 has a depressed central portion 32 containing the self-sealing plug 33 in order to prevent interference between the lower end of the needle 26 and the bottom of the cup-shaped member 29. It will be understood, of course, that, if desired, a bonded annular rubber ring, such as that illustrated in Figure 2, may be substituted for the distorted rubber ring illustrated in Figure 3.

Figure 4:
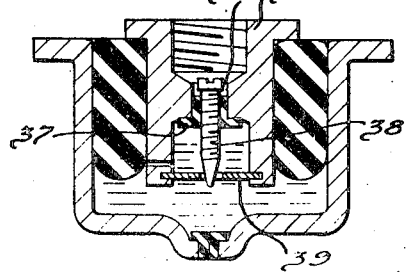
Figure 4 is a further modification of the invention similar to Figure 3 but employing a type of adjusting screw mounting which will permit repeated adjustments of the orifice opening.

In Figure 4 is illustrated a further modification of the invention similar to that illustrated in connection with Figure 3, except that the mounting for the adjusting needle is of such character as to permit repeated adjustments of the size of the aperture without danger of leakage past the threads of the needle. As there shown, the inner member 35 is provided with a central bore 36 in which is fitted a bushing 37 of rubber or similar resilient material which is under a state of high radial compression. The threaded needle 38, having a tapered end projecting through the aperture in plate 39, is threaded through the bushing 37. The threads on the needle will deform the bushing to form co-operating internal threads within the bushing with the result that by rotating the needle about its axis it may be threaded through the bushing in either direction. The high radial compression of the bushing forces the material thereof into the threads of the needle 38 and thereby prevents any leakage past the needle threads. It is preferred to employ threads on the needle 38 which have rounded roots and crests, rather than the conventional V or standard form to facilitate a sealing contact between the threads and the material of the bushing. It will be apparent that the position of the needle may be adjusted at anytime to vary the energy absorbing characteristics of the mounting.

The remaining features of the construction shown in Figure 4 may be identical to the construction illustrated in Figure 1 or Figure 3, or the mounting of Figure 4 may employ a bonded rubber insert similar to that employed in Figure 2.

Figure 6:
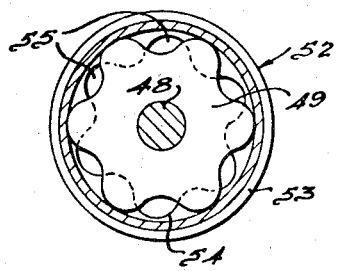
Figure 6 is a plan view taken on the line 6—6

In Figures 5 and 6 is illustrated the internal element of a further modified form of the invention incorporating a thermostatic means to control the size of the aperture in order to compensate for changes in the viscosity of the liquid used on changes in temperature. While only the inner member 40 is illustrated it will be understood that the rubber ring, the outer member of the mounting, and all other features may correspond to those employed in any of the previously described mountings. As shown best in Figure 5, the member 40 is provided with a tapped central opening 41 communicating at one end with a countersunk tapped opening 42, for use in attaching the member to the support or supported member with which the mounting is to be employed, and at the opposite end with a countersunk recess 43. Threaded within the tapped opening 41 is a plug 43a to which is fixed one end of a bimetallic helical strip 45 formed of two layers 46 and 47 of materials having widely differing thermal coefficients of expansion, in accordance with conventional practice. The flat strip is helically wound, with the result that on changes of temperature it is lower and will twist about the axis of the helix relative to its upper end. The lower end of the strip is fixed to an upwardly projecting boss 48 formed on a flat disc 49 having a scalloped periphery, as best shown in Figure 6. The extremity of the scallop projections seat against a shoulder 50 formed at the lower end of the recess 43. An annular retaining cap 52 has an axially extending portion 53, which is threaded onto the lower extremity of the member 40. The member 52 has an inwardly projecting scalloped flange 54, best shown in Figure 6. The space between the inwardly projecting flange 54 and the shoulder 50 exceeds by a small amount the thickness of the plate 49, with the result that the plate is free to rotate relative to the retaining ring 52 under the influence of the bimetallic helical coil 45.

It will be observed, as best shown in Figure 6, that the openings 55 through which the liquid will flow into the recess 43 will vary in size, depending upon the relative rotative positions of the plate 49 and the retaining ring 52. Consequently, if Figure 6 is assumed to illustrate the normal relative positions of the plate 49 and the ring 52, the thermostatic bimetallic helical coil 45 will be so arranged as to rotate the plate 49 clockwise, as viewed in Figure 6, on a decrease in temperature in order to compensate for increases in viscosity of the liquid employed.

It will be observed that, upon initial assembly of the unit the plug 43a may be rotated slightly one way or the other to obtain openings 55 of the desired normal size. After the proper rotative position of the plug 43a is established, it is locked in that position in any suitable manner as by a ring of annealed copper 57 which is hammered in place around the threaded plug.

It will be observed that when the member 40 is vibrated axially with respect to the outer member (not illustrated) in which it is mounted, the plate 49 will be free of all thrust at the point of reversal of direction of movement and may thus adjust itself under the influence of the bimetallic element 45 to the desired rotative position.

While several modifications in the invention are shown and described it will be apparent that others are available within the spirit of the invention and the scope of the appended claims.

What is claimed is:

1. A vibration mount, including a pair of co-axial elements having an annular space therebetween, an annular rubber member in said space resiliently connecting said elements and permitting relative movements of said elements only through deformation thereof one of said elements being in the form of a closed ended cylinder and the other a piston movable axially with respect thereto upon deformation of the rubber member, said annular member, said closed ended portion of said cylinder element and an end portion of said co-axial piston element defining a space, means movable with said piston for dividing said space within the closed end of the cylinder into two compartments having a restricted connecting passageway, a liquid substantially filling one of said compartments and partially filling the other, and a gas filling the remainder of said other compartment.

2. A vibration mount, including a pair of co-axial elements having an annular space therebetween, an annular rubber member in said space resiliently connecting said elements and permitting relative movements of said elements only through deformation thereof, one of said elements being in the form of a closed ended cylinder and the other a piston movable axially with respect thereto upon deformation of the rubber member, said annular member, said closed ended portion of said cylinder element and an end portion of said co-axial piston element defining a space, means dividing said space within the closed end of the cylinder into two compartments having a restricted connecting passageway, a liquid substantially filling one of said compartments and partially filling the other, and a gas filling the remainder of said other compartment, the volume of said gas-filled compartment being relatively small compared to the volume of said liquid-filled compartment, and means for adjusting the size of the restricted connecting passageway in said means.

3. A vibration mount, including a pair of co-axial elements having an annular space therebetween, an annular rubber member in said space resiliently connecting said elements and permitting relative movements of said elements only through deformation thereof, one of said elements being in the form of a closed ended cylinder and the other a piston movable axially with respect thereto upon deformation of the rubber member, said annular member, said closed ended portion of said cylinder element and an end portion of said co-axial piston element defining a space, means dividing said space within the closed end of the cylinder into two compartments having a restricted connecting passageway, a liquid substantially filling one of said compartments and partially filling the other, and a gas at super-atmospheric pressure filling the remainder of said other compartment, the volume of said gas-filled compartment being relatively small compared to the volume of said liquid-filled compartment.

4. A vibration mount, including a pair of co-axial elements having an annular space therebetween, an annular rubber member in said space resiliently connecting said elements and permitting relative movements of said elements only through deformation thereof, one of said elements being the form of a closed ended cylinder and the other a piston movable axially with respect thereto upon deformation of the rubber member, said annular member, said closed ended portion of said cylinder element and an end portion of said co-axial piston element defining a space, means dividing said space within the closed end of the cylinder into two compartments having a restricted connecting passageway, a liquid substantially filling one of said compartments and partially filling the other, and a gas at super-atmospheric pressure filling the remainder of said other compartment, the volume of said gas-filled compartment being relatively small compared to the volume of said liquid-filled compartment, and means for adjusting the size of the restricted connecting passageway in said means.

5. A vibration mount, including a pair of co-axial elements having an annular space therebetween, an annular rubber member in said space resiliently connecting said elements and permitting relative movements of said elements only through deformation thereof, one of said elements being in the form of a closed ended cylinder and the other a piston movable axially with respect thereto upon deformation of the rubber member, said annular member, said closed ended portion of said cylinder element and an end portion of said co-axial piston element defining a space, means dividing said space within the closed end of the cylinder into two compartments having a restricted connecting passageway, a liquid substantially filling one of said compartments and partially filling the other, and a gas filling the remainder of said other compartment, one of said elements having an opening therein communicating with one of said compartments and in line with said passageway, a bushing of resilient, non-metallic material fitted tightly within said opening and a threaded screw threaded through said bushing and having a tapered end projecting into said passageway for adjusting the size of the opening.

6. A vibration mount including a pair of co-axial elements having an annular space therebetween, an annular rubber member in said space resiliently connecting said elements, closing one end of said space and permitting relative movements of said elements only through deformation thereof, means closing the other end of said space to define a closed chamber within the outer element, means dividing said chamber into two compartments, means defining a restricted passageway connecting said compartments, a liquid in said chamber, and thermostatic means for controlling the size of the restricted opening and effective to decrease said opening on an increase in temperature and vice versa to compensate for changes in the viscosity of the liquid.

7. A vibration mount, including a pair of co-axial elements having an annular space therebetween, an annular rubber member in said space resiliently connecting said elements and permitting relative movements of said elements only through deformation thereof, one of said elements being in the form of a closed ended cylinder and the other a piston movable axially with respect thereto upon deformation of the rubber member, a compartment formed in said piston element, said annular member, said closed ended portion of said cylinder element and an end portion of said co-axial piston element defining a space, said compartment in said piston element communicating with said space through an opening in the bottom of said piston element and of smaller area than the cross-sectional area of said compartment, an additional relatively smaller opening through the wall of said piston element closely adjacent an end of said annular member and communicating with said compartment and said space for preventing air pockets in said space, a liquid substantially filling said space and partially filling said compartment, a gas filling the remainder of said compartment.

8. A vibration mount, including a pair of co-axial elements having an annular space therebetween, an annular rubber member in said space resiliently connecting said elements and permitting relative movements of said elements only through deformation thereof, one of said elements being in the form of a closed ended cylinder and the other a piston movable axially with respect thereto upon deformation of the rubber member, a compartment formed in said piston element, said annular member, said closed ended portion of said cylinder element and an end portion of said co-axial piston element defining a space, said compartment in said piston element communicating with said space through an opening of smaller area than the cross-sectional area of the piston element, a liquid substantially filling said space and partially filling said compartment, a gas at super-atmospheric pressure filling the remainder of said compartment, said compartment being of substantially smaller volume than said space.

9. A vibration mount, including a pair of co-axial element having an annular space therebetween, an annular load-supporting rubber member in said space resiliently connecting said elements and permitting relative movements of said elements only through deformation thereof and under radial compression therebetween, one of said elements being in the form of a closed ended cylinder and the other a piston movable axially with respect thereto upon deformation of the rubber member, a compartment formed in said piston element, said annular member, said closed ended portion of said cylinder element and an end portion of said co-axial piston element defining a space, said compartment communicating with said space, a liquid substantially filling said space and partially filling said compartment, a gas filling the remainder of said compartment, said compartment being of smaller volume than said space.

10. A vibration mount, including a pair of co-axial elements having an annular space therebetween, an annular rubber member in said space resiliently connecting said elements and permitting relative movements of said elements only through deformation thereof, one of said elements being in the form of a closed ended cylinder and the other a piston movable axially with respect thereto upon deformation of the rubber member, a compartment formed in said piston element, said annular member, said closed ended portion of said cylinder element and an end portion of said co-axial piston element defining a space, said compartment communicating with said space, a liquid substantially filling said space and partially filling said compartment, a gas filling the remainder of said compartment, said compartment being of substantially smaller volume than said space.

11. A vibration mount, including a pair of co-axial elements having an annular space therebetween, a load-supporting annular rubber member in said space resiliently connecting said elements and permitting relative movements of said elements only through deformation thereof, and under a state of radial compression and axial elongation therebetween, one of said elements being in the form of a closed ended cylinder and the other a piston movable axially with respect thereto upon deformation of the rubber member, a compartment formed in said piston element, said annular member, said closed ended portion of said cylinder element and an end portion of said co-axial piston element defining a space, said compartment communicating with said space through a restricted opening, a liquid substantially filling said space and partially filling said compartment, a gas filling the remainder of said compartment, and means for adjusting the size of the restricted opening.

12. A vibration mount, including a pair of co-axial elements having an annular space therebetween, a load-supporting annular rubber member in said space resiliently connecting said elements and permitting relative movements of said elements only through deformation thereof, and under high radial compression and axial elongation therebetween, one of said elements being in the form of a closed ended cylinder and the other a piston movable axially with respect thereto upon deformation of the rubber member, a compartment formed in one of said elements, said annular member, said closed ended portion of said cylinder element and an end portion of said co-axial piston element defining a space, said compartment communicating with said space through a restricted opening, a liquid substantially filling said space and partially filling said compartment, a gas at super-atmospheric pressure filling the remainder of said compartment, and means for adjusting the size of the restricted opening, said compartment being of substantially smaller volume than said space.

13. A vibration mount, including a pair of co-axial elements having an annular space therebetween, an annular rubber member in said space resiliently connecting said elements, permitting relative movement of said elements only through deformation thereof, said annular member being retained under substantial radial compression and axial elongation between said said co-axial elements, one of said elements being in the form of a closed ended cylinder and the other of said elements being a piston movable axially with respect thereto, a closed ended portion of said closed ended cylinder and an end portion of the other co-axial element cooperatively defining a space, means movable with said piston element dividing said space into two compartments having a restricted connecting passageway, a liquid substantially filling one of said compartments and partially filling the other and a gas filling the remainder of said other compartment.

14. A vibration mount, including a pair of co-axial elements having an annular space therebetween, an annular rubber member in said space resiliently connecting said elements and permitting relative movement of said elements only by distortion thereof said annular member being under a state of distortion due to radial compression and axial elongation therebetween, means dividing the space within the closed end of the cylinder into two compartments having a restricted connecting passageway, a liquid substantially filling one of said compartments and partially filling the other, and a gas filling the remainder of said other compartment, one of said elements having an opening therein communicating with one of said compartments and in line with said passageway, a bushing of resilient, non-metallic material fitted tightly within said opening and a threaded screw threaded through said bushing and having a tapered end projecting into said passageway for adjusting the size of the opening.

LEON F. THIRY.

REFERENCES CITED

The following references are of record in the file of this patent:

UNITED STATES PATENTS

| Number | Name | Date |
|---|---|---|
| 1,975,145 | Geyer | Oct. 2, 1934 |
| 1,988,194 | Erlandsen | Jan. 15, 1935 |
| 2,069,791 | Wallace | Feb. 9, 1937 |
| 2,212,922 | Mercier | Aug. 27, 1940 |
| 2,336,137 | Thornhill | Dec. 7, 1943 |